United States Patent
Paz-Pujalt

(10) Patent No.: US 10,248,972 B2
(45) Date of Patent: Apr. 2, 2019

(54) INDIVIDUAL OR GROUP PROFILE MONETIZATION AND MEDIATION

(71) Applicant: Gustavo R. Paz-Pujalt, Rochester, NY (US)

(72) Inventor: Gustavo R. Paz-Pujalt, Rochester, NY (US)

( * ) Notice: Subject to any disclaimer, the term of this patent is extended or adjusted under 35 U.S.C. 154(b) by 177 days.

(21) Appl. No.: 14/305,458

(22) Filed: Jun. 16, 2014

(65) Prior Publication Data

US 2014/0372228 A1  Dec. 18, 2014

Related U.S. Application Data

(60) Provisional application No. 61/834,960, filed on Jun. 14, 2013.

(51) Int. Cl.
*G06Q 30/02* (2012.01)
*G06Q 50/00* (2012.01)

(52) U.S. Cl.
CPC ..... *G06Q 30/0271* (2013.01); *G06Q 30/0273* (2013.01); *G06Q 50/01* (2013.01)

(58) Field of Classification Search
CPC .... G06Q 30/00; G06Q 30/02; G06Q 30/0241; G06Q 30/0251; G06Q 30/0269; G06Q 30/0271
USPC .......................................... 705/14; 455/556.1
See application file for complete search history.

(56) References Cited

U.S. PATENT DOCUMENTS

| | | | |
|---|---|---|---|
| 2007/0198536 A1* | 8/2007 | Coutts | G06Q 30/06 |
| 2011/0223970 A1* | 9/2011 | Mori | H04M 1/2755 |
| | | | 455/556.1 |
| 2013/0080321 A1* | 3/2013 | Mulhall | G06Q 30/06 |
| | | | 705/41 |

* cited by examiner

*Primary Examiner* — Marilyn G Macasiano
(74) *Attorney, Agent, or Firm* — Bassett IP Strategies; David F. Bassett

(57) ABSTRACT

A method of obtaining demographic profiles of individuals or groups of individuals and monetizing the profiles while compensating the individuals whose profiles are monetized.

19 Claims, 8 Drawing Sheets

INDIVIDUAL OR GROUP PROFILE MONETIZATION AND MEDIATION

CROSS REFERENCE

This application claims the benefit of the filing date of U.S. Provisional Patent Application Ser. No. 61/834,960, filed Jun. 14, 2013, and of U.S. Non-provisional patent application Ser. No. 14/305,458, filed Jun. 16, 2014, which are hereby incorporated by reference in their entirety.

FIELD

This invention relates to developing and maintaining profiles for an individual, and in particular, to monetizing the individual's profile by making the profile available to users while compensating the individual represented within the profile.

BACKGROUND

The area of market intelligence (or simply intelligence) and in particular the area of direct marketing continues to grow while merchants, advertisers, and other interested parties are constantly looking for means of making messages, rewards, and opportunities or plain knowledge of individuals or group of individuals profiles more relevant and attractive than those of competitors. In addition advertisers, for example, are constantly looking for better and more accurate ways of targeting the messages, offers, and opportunities ("messages") so that their products and services are selected and acted upon by the recipients of the messages in what is known in the art as a "customer call-to-action". That is, the recipient or people associated with the recipient will actually take advantage of any offers announced by the message and otherwise engage the services related to the message(s). Furthermore, advertisers are constantly seeking ways of measuring the effectiveness or response of their marketing campaigns. One form of direct marketing is the use of direct mail. One of the disadvantages of direct mail is that it may alienate or annoy some recipients by constantly having to deal with unwanted or unsolicited mail, sometimes referred to as "junk mail". Another form of direct marketing or advertisement is the use of pop-ups, spamming (mass mailing) of Internet or web related information. Users are able to block some of these items thereby not letting advertisers deliver their messages. Another form of direct marketing is telemarketing, where marketers attempt to deliver unsolicited telephone messages. Customers may block these types of messages thereby impeding their delivery.

Up to this time advertisers have turned to a multitude of approaches for better targeting their audiences. These range from target customer lists, questionnaires, live or online surveys, analysis of on-line behavior including but not limited to web pages visited, key words on mail streams, geographic and or demographic origin or destination of mail, online queries, and so on. While these methods provide differing levels of accuracy there is still a need to further refine desired targets, cohorts or demographic searches based on life styles.

Currently with the popularization and prevalence of digital photography or imaging there is a very large inventory of digital images stored on computer memories, camera memories, removable memories devices, and commercial and private databases, all potentially and seamlessly connected by the Internet. The art lacks the ability to utilize these images as sources of valuable, unique and highly personalized, information regarding people's preferences, behaviors, life styles, demographics and unarticulated product/service features.

SUMMARY

It is said "a picture is worth a thousand words", henceforth one of the objectives of the present invention is to extract that metaphorical information from photographs, analog, digital and otherwise, for potential use. This invention discloses the ability to turn pictures into sources of information for parties desiring to use that information for different purposes ranging from advertising to intelligence gathering and security.

An aspect of the present invention relates to a method for providing a profile of at least one individual including interrogating at least one database containing at least one set of personal data; deriving at least one profile for at least one individual from the at least one set of personal data; making the at least one profile available for a fee to at least one third party; and compensating the at least one individual represented by the at least one profile.

Another aspect of the present invention relates to a non-transitory computer readable medium storing a computer readable program code having stored thereon instructions for sponsored printing of images with promotional material including machine executable code which when executed by at least one processor, causes the processor to perform steps of interrogating at least one database containing at least one set of personal data; deriving at least one profile for at least one individual from the at least one set of personal data; making the at least one profile available for a fee to at least one third party; and compensating the at least one individual represented by the at least one profile.

Another aspect of the present invention relates to a system for monetizing a profile of at least one individual including a user computing system capable of interrogating at least one database containing at least one set of personal data and deriving at least one profile for at least one individual from the at least one set of personal data; and a transaction receiving agency capable of making the at least one profile available for a fee to at least one third party and compensating the at least one individual represented by the at least one profile.

Another aspect of the present invention relates to the creation of valuable profiles by combining image analysis with existing or derived personal information available through public records (for example, register of deeds, credit bureaus, existing data vendors, and the like), and digital and analog social networks. This invention also discloses ways of managing and monetizing database information.

One aspect of the present invention is directed to solving the problem of the alienation of recipients of advertising by providing messages that more closely match their demographic characteristics, user profiles, or needs.

It is one object of the present invention to create, manage and monetize databases with individual profiles while providing ways for the individuals represented by the profiles to benefit monetarily and otherwise from the use by third parties of their profiles.

Another object of the present invention is to provide the individuals the ability to decide which pieces of information enter into their profiles, yet another aspect of the present invention is to provide the individuals the ability to recommend, suggest and otherwise request who gets their profiles.

It is another object of the present invention to provide an expeditious way of obtaining relevant information from the analysis of images for the purpose of better targeting the delivery of information to the owners and or subjects of the images. Heretofore when we refer to images it will be understood that text and graphics may be included within the term images. In addition it will be understood that images also mean video images and streams.

In one particular aspect of the present invention one may use standard image classification tools as defined and described by the Information Interchange Model (11M). Image analysis may include image taxonomy or what is commonly known in the art as folksonomy, when numerous individuals contribute to the categorization of images' contents. This is also known in the art as collaborative tagging.

Another aspect of the present invention is directed to purchasing or otherwise obtaining personal data information for populating a database to be used in conjunction with the object of this invention.

Yet another object of the present invention is to obtain and source information from third parties including individuals in digital or analog form explicitly or by inference.

Another aspect of the present invention is to continually update the demographic profile sets by identifying affinity groups that may be of interest to the owner of the images. Affinity groups may include but are not limited to organizations (for example, civic, religious, sports, special interest, and the like), product categories (for example, fishing, hunting, cooking, and the like), physical activities (for example, hiking, traveling, gaming, and the like), and others. Thus, a person interested in a particular activity, as inferred from their images, may be interested in joining organizations associated to that given activity and or meeting groups or individuals that match similar criteria or characteristics. Conversely, a given interest group may be interested in identifying prospects.

Another aspect of the present invention is to analyze the contents of consumer's images using object recognition algorithms, image classification algorithms, image segmentation and other forms of machine vision in order to detect special features contained in the images and matching such features to advertiser-described parameters or characteristics such that they may lead to better advertisements or promotions. In one example the detection of outdoor images may suggest outdoor activities like camping, hiking, golf and by association the equipment, venues, or locations related to those activities. The user of this inferred or derived information may then decide to provide this information to advertisers interested in outdoor enthusiasts. Likewise, the information may be made available to groups interested in outdoor activities.

Another aspect of the present invention is to add the objects or features detected in the images to a general profile of the owner of the images. Yet another object of the present invention is to match objects in the image profile of the image owner to specific promotional and advertising materials at deferred times when the image owner requests printed images.

Another aspect of the present invention is to access public databases, such as for example, a registry of deeds, containing profiles of individuals and offering sponsored printed images based on matching these profiles to coupons and promotional materials to be printed or presented with printed images.

Another aspect of the present invention is to access databases related to life event registries, such as for example, weddings, baby showers, memorials and others, containing profiles of individuals and offering sponsored printed images based on matching these profiles to coupons and promotional materials to be printed or presented with printed images. In one aspect of the present invention account identifying features like names addresses, social security numbers and other relevant information may be used to search in such databases, thus identifying account holders with specific data contained in databases.

Another aspect of the present invention is to access third party databases like Facebook, Myspace, Friendster, iTunes, LinkedIn, Instagram, and others, containing profiles of individuals. In one embodiment the database may be queried for individuals with specific interests like sport automobiles and this particular pool of individuals may be grouped into a pertinent profile in order to receive requests and or offers. In another embodiment widgets associated to the gathering of information and usage patterns may be installed in these individual's web pages. A web widget is a portable portion of code that can be installed and executed in a computing device to perform a specific function. In this particular case sponsored printing. In another embodiment the databases may be queried for the names of individuals that already have accounts with sponsored image service providers in order to gain access to more or additional profiling information about these individuals. Furthermore, public, semi-public, and private databases may be searched in what is known in the art as "web scraping", that is grabbing public, semipublic, or private information based on specified criteria for the purpose of offering sponsored prints or for the purpose of improving individual's profiles.

Yet another object of the present invention is to provide pollsters, advertisers, and media analysts (Nielson, Harris) with the ability to offer free or sponsored prints in exchange for information from the owners of the images or from the databases created with image owner profiles. It will be understood by anyone skilled in the art that personal and group data may be synthetic data as described in the literature. That is information derived or inferred not by direct measurement but by analysis. In particular synthetic data analysis may be used to mask or make anonymous personal data while still using the data to gain information.

These and other objects are achieved by a method of and system for a) electronically transmitting, for example, digital data, unique data ownership identifiers, location information and account information from a computing device over a communications channel to a central receiving agency or a clearing house which stores such data and unique image identifiers, location information and account information in memory; b) identifying a particular stored data set in the memory using the corresponding unique image identifier and locator information for purposes of, for example, sponsored printing; c) selecting interested parties appropriate for the profile; d) transmitting the identified particular stored data in the memory to the sorting location of each of the recipients; and d) printing the image at the printing location of each of the recipients and delivering the printed image along with the promotional materials to the location corresponding to each of the recipients.

DETAILED DESCRIPTION

Figure 1:
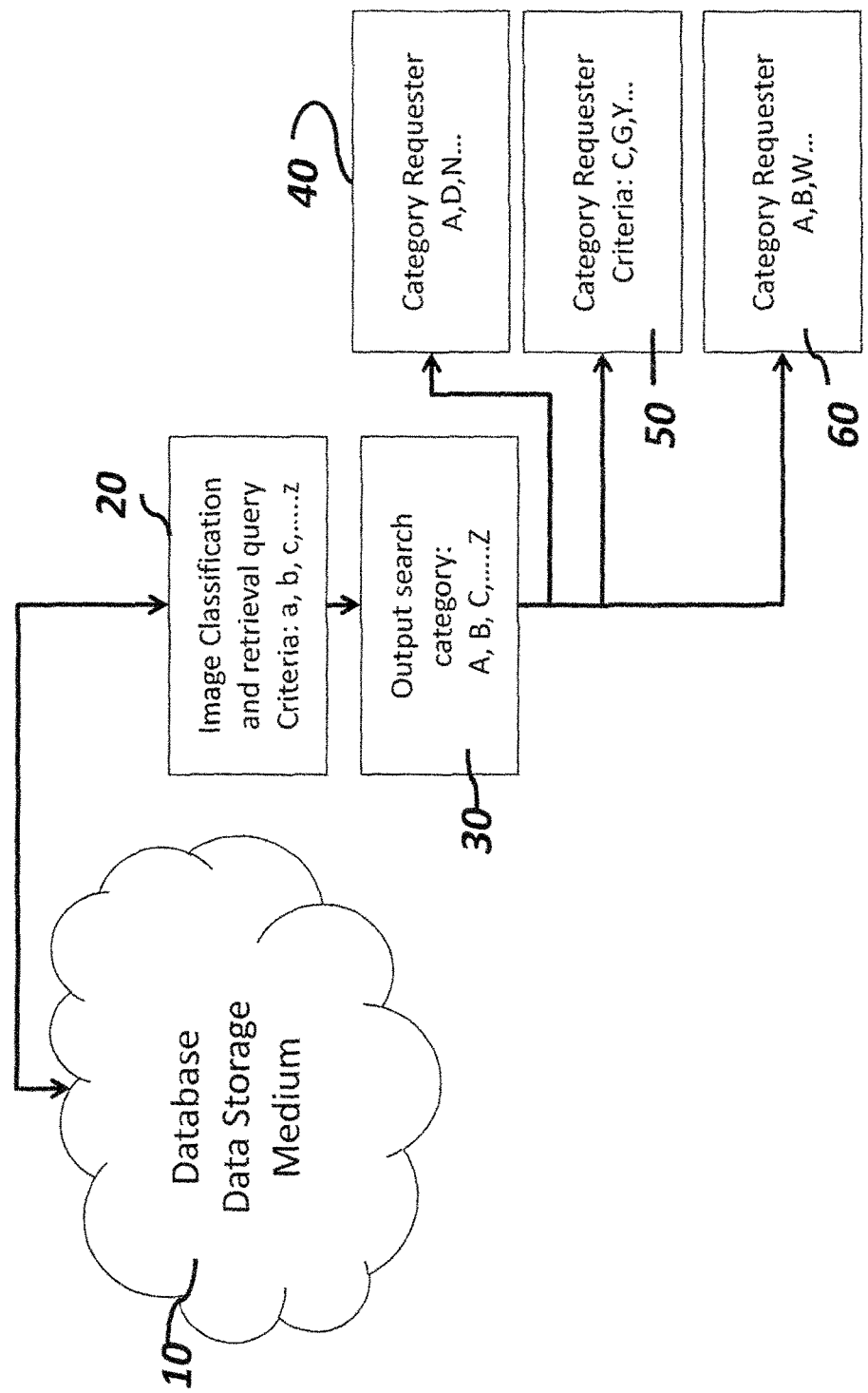
FIG. 1 is a block diagram in accordance with the present invention of an embodiment of a system for classifying personal data based on a pre-defined search criteria.

This invention relates to a method and system for collecting, analyzing, deriving, and updating individual's profile according to pre-established criteria and making the profile available to third party users while compensating the individuals represented within the profile. The invention further relates to sourcing, developing, creating, defining and maintaining demographic profiles for individuals, based on their images as available in, for example, databases, computer memory, camera memory cards, and social media. The invention further provides for the management of profiles and for the participation of the profiles in determining the information that may be included in the profiles. Furthermore the invention allows for the monetization of profiles by the owners of the profile similarly to what is done for music and other artistic creations. The invention provides for the monitoring, protection and compensation of individuals whose profiles are used for a variety of purposes including commercial purposes where the individual has control over the content of their profile and who can receive the profile by using, for example, a process referred to as Personal Digital Rights Management (PDRM).

A method and system of printing images for a recipient, includes electronically transmitting digital images and image locator information from a location remote from and over a communication channel to a central receiving agency which stores such images and locator information in memory; and identifying a particular set of stored images in the memory using the corresponding image locator information and the location of one or more recipients and printing locations. The invention further includes transmitting the identified particular stored image in the memory to the printing location; and delivering the printed image to the location corresponding to the owner of the images. The invention further includes the ability to combine information that may be of interest to the recipient of the printed images. The invention further includes obtaining information of interest to the recipients from user profiles, demographic information or image analysis. The invention further includes the ability of having at least one sponsor cover at least a portion of the costs associated with producing the image and message.

In an embodiment, the invention includes a) electronically transmitting digital data, unique data ownership identifiers, location information and account information from a computing device over a communications channel to a central receiving agency or a clearing house which stores such data and unique image identifiers, location information and account information in memory; b) identifying a particular stored data set in the memory using the corresponding unique image identifier and locator information for purposes of sponsored printing; c) selecting interested parties appropriate for the profile; d) transmitting the identified particular stored data in the memory to the sorting location of each of the recipients; and d) printing the image at the printing location of each of the recipients and delivering the printed image along with the promotional materials to the location corresponding to each of the recipients. The invention can be performed remotely using WAN, and locally using LAN. In some examples we refer to images as a specific example of data. It will be understood by one skilled in the art that data may represent for example, still or video images, voice data, document data, pre-filtered data, public record data, and any other form of data pertaining to an individual's life style preferences, demographics, activities, and related interests.

In one particular case the devices associated with the creation of individual data include mobile devices like phones, portable music players (MP3 devices), pedometers, physical activity monitors variously connected to the network via cloud computing, wireless connection or on-demand connection when data-wise associated with a computing device online or wirelessly. Additionally these mobile devices are variously equipped with geo-positioning systems (GPS) and geographic information systems (GIS) that generate location-based information and data. These data are recorded and stored on databases that become the sources of data to generate profiles for individuals. These profiles range from music preferences, to customary roaming areas defined by geographic coordinates. In addition to time of day, geographic location, other patterns may be recorded and stored. In one particular example an individual's choice of music for exercising may be stored and catalogued in the form of particular music genres, beats, rhythms and so on. In one aspect these music-related data may be analyzed by a plurality of signal processing methods like histograms, frequency-time transforms, in order to define characteristic patterns for a given individual. As a result of this analysis the individuals may be the object of potentially preferred styles of music or in one particular case the synthetic creation of music beats suitable to that particular individual derived from usage patterns. The present invention provides a number of advantages including providing an effective method and system for delivering digital music at a lower cost through the use of sponsored promotional materials.

The system includes a plurality of user computing systems for deriving data, such as images, demographic information, creating profiles from the data, storing the profiles and providing the profiles to third parties, and a sponsored printing system, although the system can include other types and numbers of systems, devices, and components that are configured in other manners. The present invention provides a number of advantages including providing an effective method and system for delivering printed pictures of digital images at a lower cost through the use of sponsored promotional materials.

The user computing systems can be used to provide image, registration and demographic information about each user, transmit one or more images from each user to storage, providing a selection of one or more of the images for printing, and receiving the selected images with associated promotional materials for printing, although other types and numbers of systems could be used and other types and numbers of functions can be performed by the user computing system. Each of the user computing systems can include a central processing unit (CPU) or processor, a memory, user input device, a display, a printing device, and an interface system, and which are coupled together by a bus or other link, although each of the user computing systems can include other numbers and types of components, parts, devices, systems and elements in other configurations. The processor executes a program of stored instructions for one or more aspects of the present invention as described and illustrated herein, although the processor could execute other numbers and types of programmed instructions.

The memory which comprises a non-transitory computer readable medium storing a computer readable program code stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other non-transitory computer readable medium storing computer readable program code which is read from and/or written to by a magnetic, optical, or other reading and/or writing system that is coupled to one or more processors, can be used for the memory.

The user input device in each of the user computing systems is used to input selections, such as to input registration and demographic information about each user, input third party inquiring or to select one or more of the images for mining information or printing, although the user input device could be used to input other types of data and interact with other elements. The user input device can include a computer keyboard and a computer mouse, although other types and numbers of user input devices can be used. The display in each of the user computing systems is used to show data and information to the user, such as the fields for entering registration and demographic data, copies of images stored for the user to select from, or the image and associated promotional material to be printed by way of example only. The display can include a computer display screen, such as a CRT or LCD screen, although other types and numbers of displays could be used. The printing device in each of the user computing systems can be used to print the selected images and associated promotional material.

The interface system is used to operatively couple and communicate between each of the user computing systems and the receipt of an individual profile or the sponsored printing system over a communication network, although other types and numbers of communication networks or systems with other types and numbers of connections and configurations to other types and numbers of systems, devices, and components can be used. By way of example only, the communication network can use TCPIIP over Ethernet and industry-standard protocols, including SOAP, XML, LDAP, and SNMP, although other types and numbers of communication networks, such as a direct connection, a local area network, a wide area network, modems and phone lines, e-mail, and wireless communication technology, each having their own communications protocols, can be used.

The system stores images, demographic information and the like for the users, processes the profile inquiry or image printing requests, identifies promotional material associated with each image selected for marketing, or printing and providing each image and the identified promotional material for printing, although the sponsored printing system can perform other types and numbers of functions and there may be other numbers of printing systems. The system includes a central processing unit (CPU) or processor, a memory, a printing device and an interface system which are coupled together by a bus or other link, although other numbers and types of each of the components and other configurations and locations for the components can be used. The processor executes a program of stored instructions for one or more aspects of the present invention as described herein. The memory stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other non-transitory computer readable medium storing a computer readable program code which is read from and/or written to by a magnetic, optical, or other reading and/or writing system that is coupled to the processor, can be used for the memory in sponsored printing system. The printing device can be used to print the selected images and associated promotional material. The interface system is used to operatively couple and communicate between the sponsored printing system and each of the user computing systems, although other types of connections and other types and combinations of systems could be used.

Although embodiments of the user computing systems and sponsored printing system are described and illustrated herein, the user computing systems and sponsored printing system can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, digital signal processors, and micro-controllers, programmed according to the teachings of the embodiments, as described and illustrated herein, and as will be appreciated by those ordinary skill in the art.

In addition, two or more computing systems or devices can be substituted for any one of the systems in any embodiment of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a non-transitory computer readable medium storing a computer readable program code having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

As shown in FIG. 1, image database categorization and retrieval, a data storage medium 10 containing images is acted upon by an image classifier 20 according to certain classification criteria. The resulting search produces an output 30 based on the criteria whereupon different classification and search criteria are parsed into categories 40, 50, and 60 representing the classification and search criteria requested by a given requester.

Figure 2:
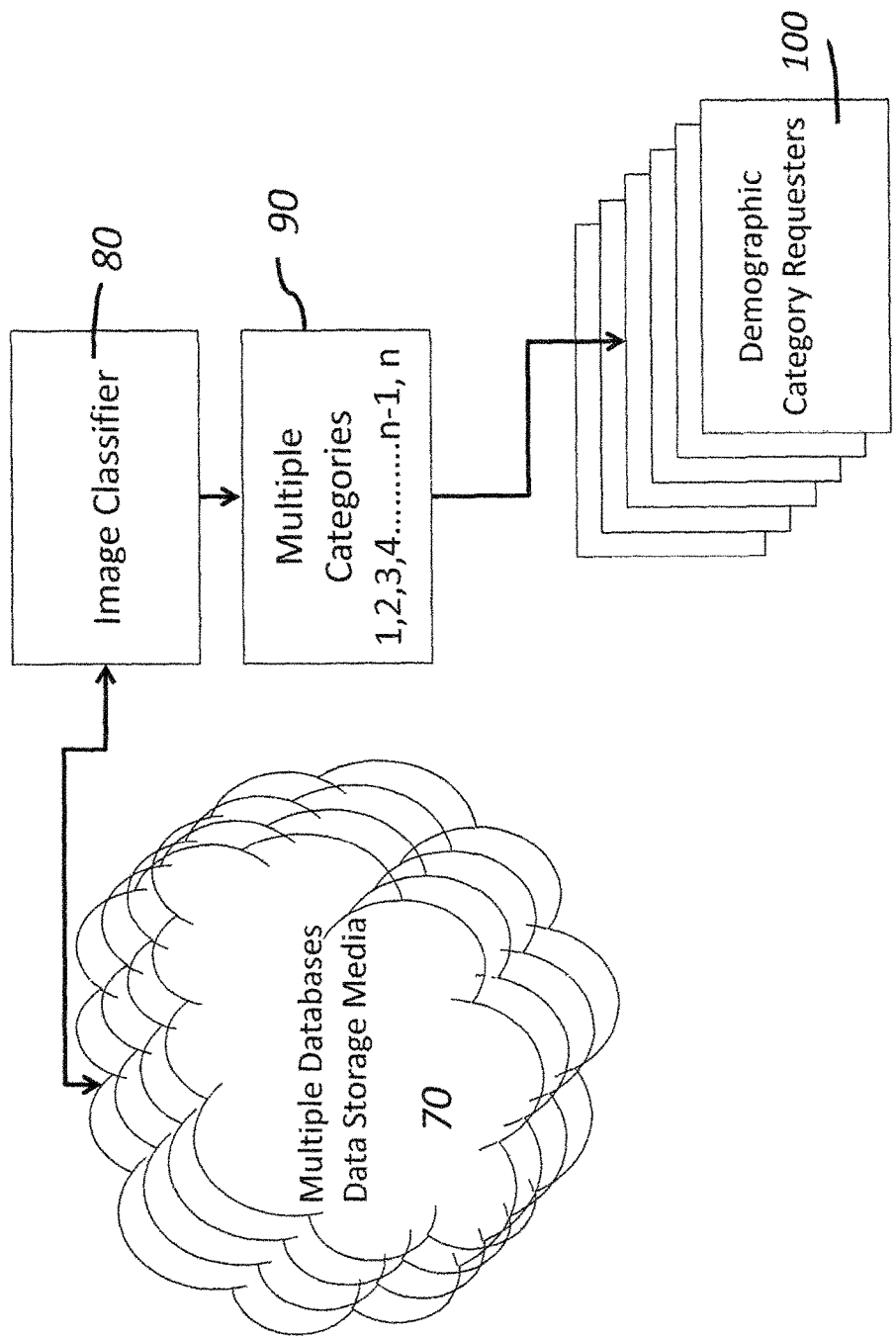
FIG. 2 is a block diagram in accordance with the present invention of an embodiment of a system including multiple database personal data categorization and retrieval.

As shown in FIG. 2, multiple database image categorization and retrieval, a set of different data storage media or multiple databases 70 is interrogated by an image classifier 80 and classified under multiple categories 90, whereupon various demographic characteristics 100 are derived based on the information contained on the images stored on the different data storage media or multiple databases 70.

Figure 3:
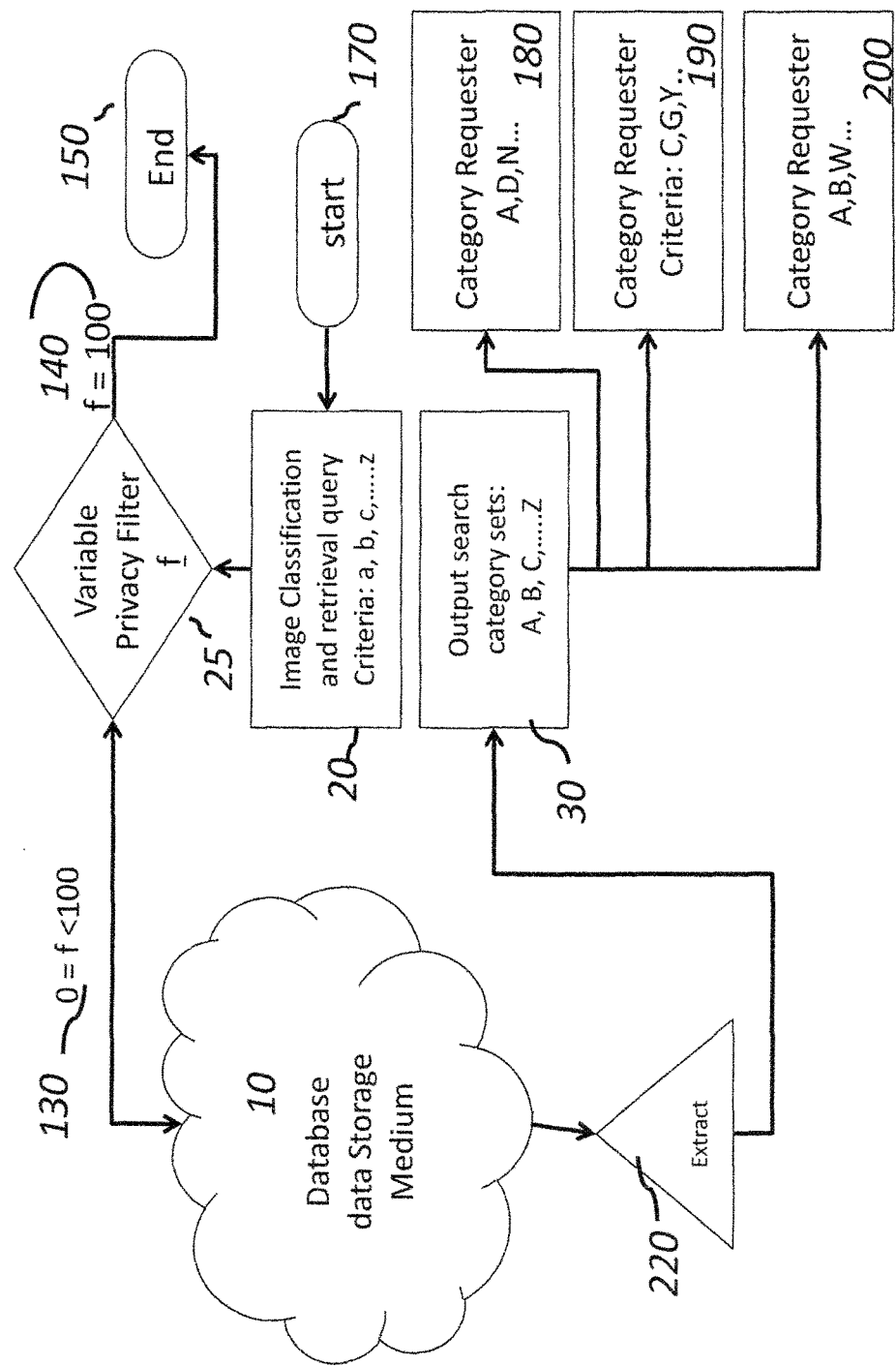
FIG. 3 is a block diagram in accordance with the present invention of an embodiment of a system including personal data categorization and retrieval through a privacy filter.

As shown in FIG. 3, image categorization and retrieval through privacy filter, a data storage media or database 10 is interrogated by an image classification and retrieval query 20 according to the instructions of a variable privacy filter 25 set by the owner of the images, which filter setting f is set from zero to under one hundred to signify the level of privacy required, where a privacy value 140 set at 100 means total privacy, therefore the query operation ends 150, whereas any privacy setting 130 where f is less that 100 results in some level of access to the image data for classification. When the privacy filter 25 is set 130 below 100 the image classification and retrieval query 20 will commence 170 and imaged data will be extracted 220 and the output will be classified according to certain category sets 30. The different categories obtained will be provided, for example, to requesters 180 based on categories A, D, N and so on, whereas requester 190 will be provided with categories C, G, Y and so on, and likewise requester 200 will be provided with categories A, B, W, and so on.

Figure 4:
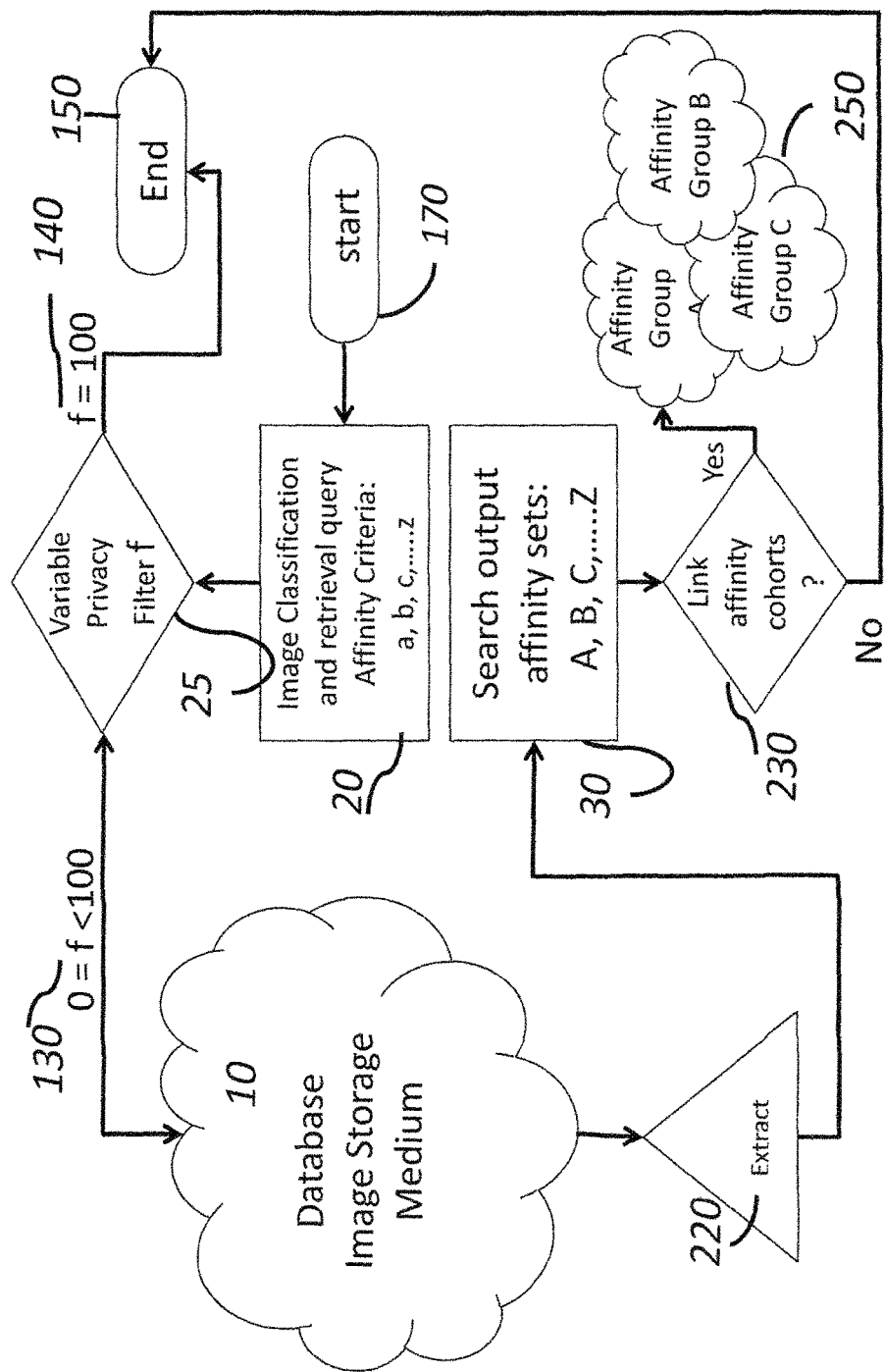
FIG. 4 is a block diagram in accordance with the present invention of an embodiment of a system including personal data categorization and affinity group retrieval and connection.

As shown in FIG. 4, image categorization and affinity group retrieval and connection, a database or storage medium 10 is interrogated by an image classification and retrieval query 20 provided privacy filter 25 is set 130 at a value less than one hundred, thus allowing some level of interrogation, otherwise when the privacy filter 25 is set 140 at one hundred the transaction will be terminated 150. Upon classification and retrieval 20 images meeting the set forth affinity criteria a, b, c, . . . n and so on will be extracted 220 and the results will be presented as affinity sets 30 A, B, C . . . N and so on. The affinity sets 30 may be matched up or linked to existing affinity groups or cohorts 250 or may be terminated 150 in the absence of a matching cohort.

Figure 5:
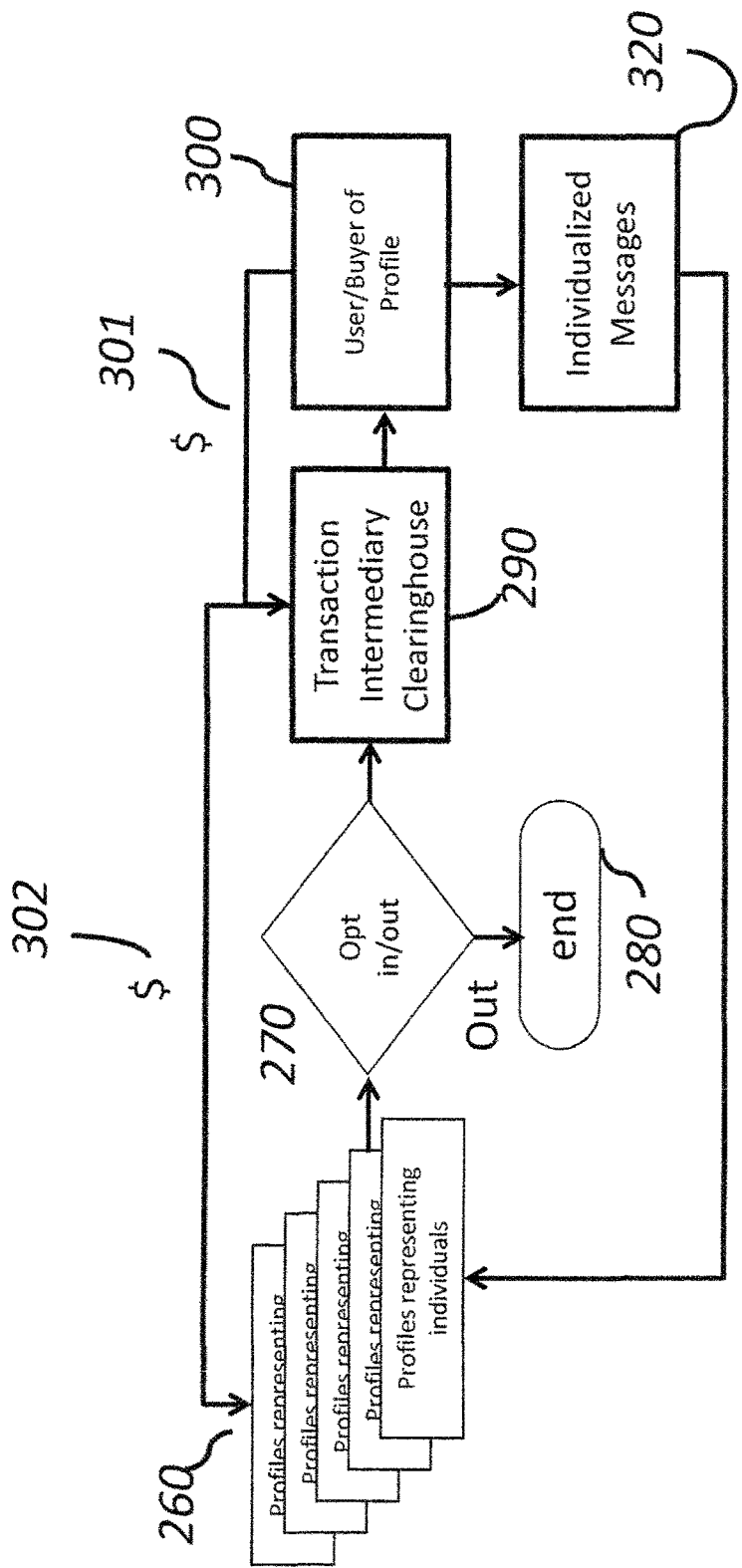
FIG. 5 is a block diagram in accordance with the present invention of an embodiment of a system including a compensation model for individual(s) represented within profiles.
Figure 6:
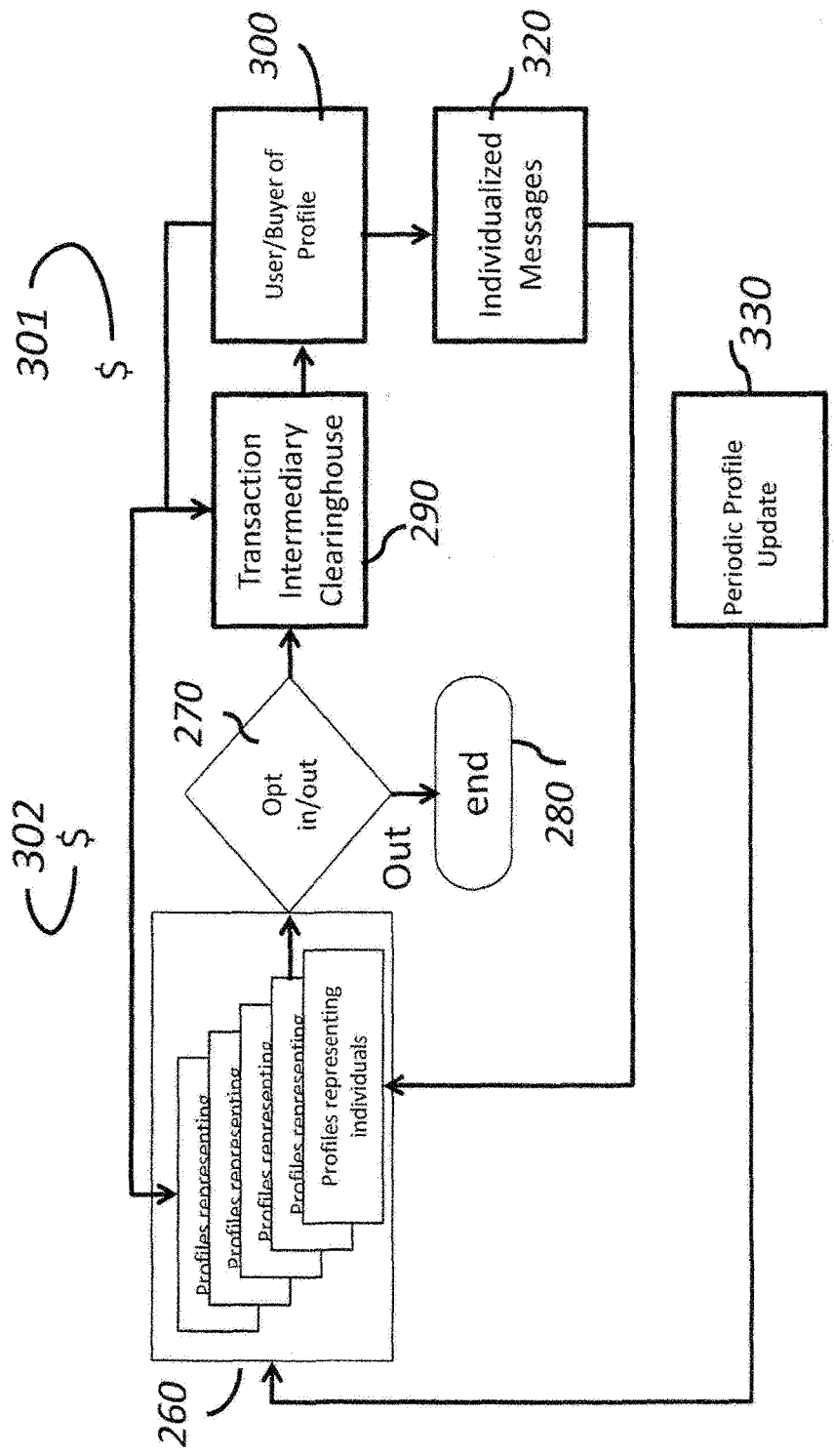
FIG. 6 is a block diagram in accordance with the present invention of an embodiment of a system including a continuous profile update model for individual(s) represented within profiles database.

As shown in FIG. 5, compensation model for individual(s) represented within profiles and 6, continuous profile update model for individual(s) represented within basis set, in a set of profiles representing individuals 260, the individual profiles or groups of profiles are requested to opt in or out 270 on a given transaction involving the use of their profiles. Whereas some individuals will opt in a transaction will be initiated 290 providing as user or buyer of the individual's profile 300 access to the given profiles in exchange of a given fee, point system, or reward 301 given to the transaction intermediary or clearinghouse 290. Meanwhile the intermediary or clearinghouse 290 will share at least one portion of the given fee, point system, or reward with the individual whose profile has been selected. Upon completion of the transaction with the transaction intermediary or clearinghouse the buyer or user of the profile 300 may use at least part of the individual's profile to create individualized messaged based on the individual's profiles and preferences 320. As shown in FIG. 6, the profiles of individuals 260 are periodically refreshed 330 to maintain for example, currency, accuracy, changing preferences, life status, and the like.

Figure 7:
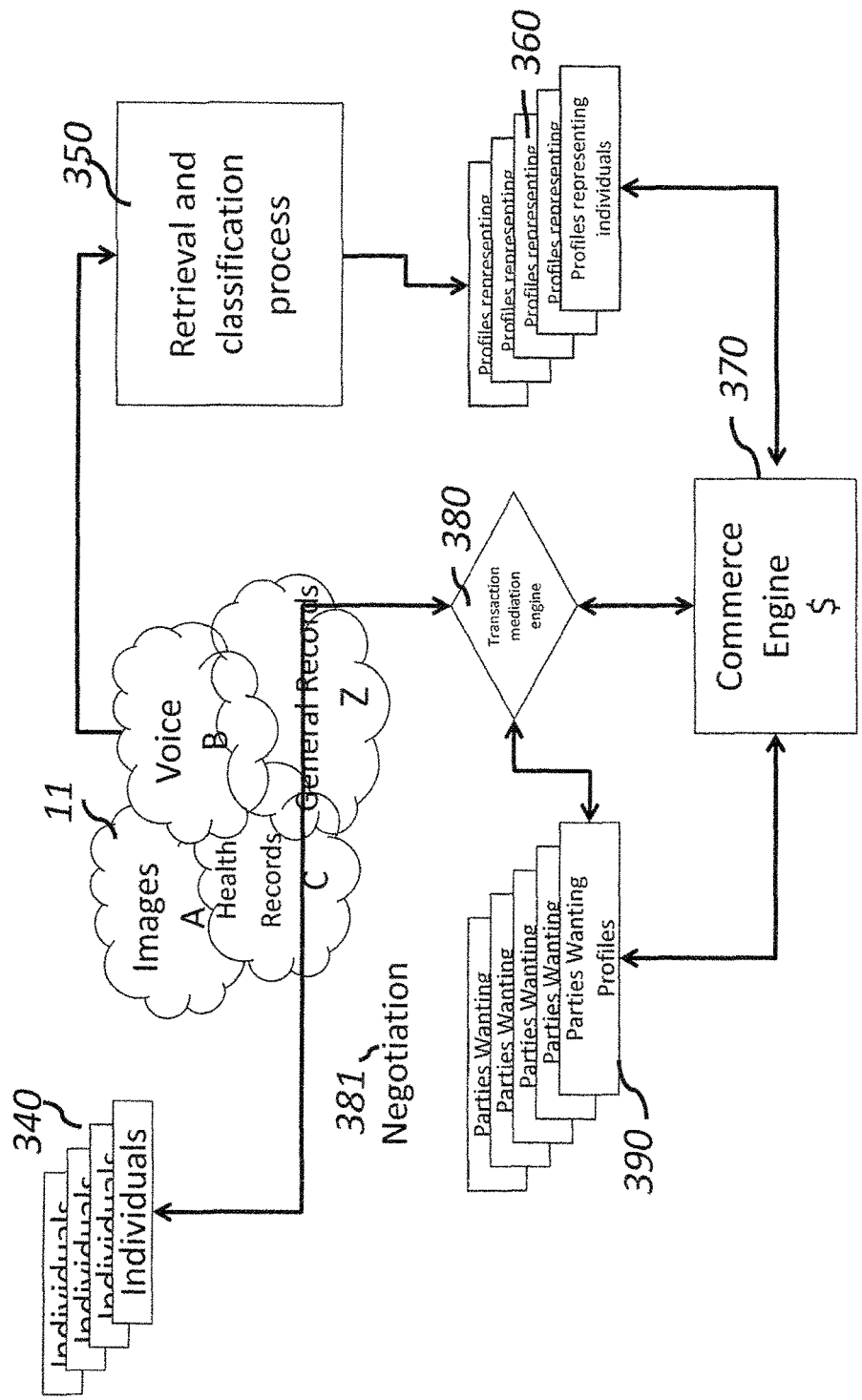
FIG. 7 is a block diagram in accordance with the present invention of an embodiment of a transaction apparatus.

A set of expanded databases 11 is shown in FIG. 7, transaction apparatus, containing different types of individual data from for example, images, voice, health records, general records and so on is acted upon by a retrieval and classification system 350 whereupon a number of profiles 360 representing individuals are created. Through commerce engine 370 the profiles are offered to interested parties 390, meanwhile through a transaction mediation engine 380 a negotiation 381 is set forth with the individuals 340 whose profiles are desired. In this negotiation 381 the individuals 340 may provide additional information to enhance their profiles and preferences and be compensated by commerce engine 370 for the use of their profiles 360 by parties 390 wishing to use those profiles 360. Commerce engine 370 acts as a mediator and optimizer of transactions involving individual's profiles 360, between the actual individuals 340 and third parties wanting to use the profiles 390.

Figure 8:
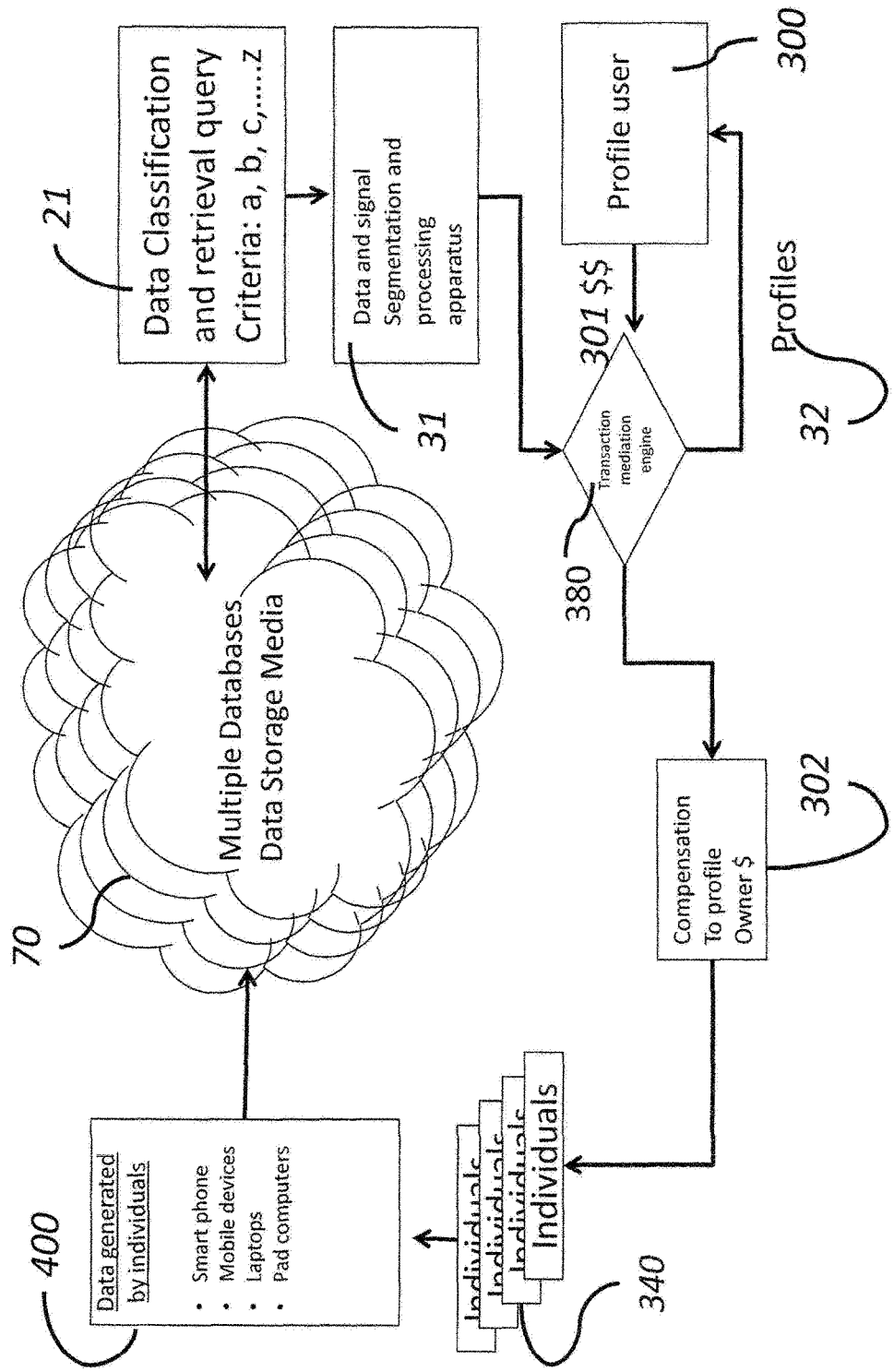
FIG. 8 is a block diagram in accordance with the present invention of an embodiment of a data generation, storage, classification, and transaction mediation apparatus.

FIG. 8, data generation, storage, classification, and transaction mediation apparatus, describes an embodiment of a multiplicity of individual data generating mobile devices 400 in data-wise relationship with storage media 70 whereupon a request for individual profiles 21 a query is triggered and the data output is analyzed by a data and signal processing apparatus 31 including algorithms and subroutines. A transaction mediation apparatus 380 provides profiles to a profile requester 300 that in turn pays 301 for the profiles through the transaction mediation apparatus 380. The transaction mediation apparatus 380 compensates 302 the profile owner 340.

Although various embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A method for providing on a computer system comprising a transaction apparatus, said transaction apparatus comprising a transaction mediation engine, a retrieval and classification system, a commerce engine, a privacy filter, and a data signal processing apparatus a profile of at least one individual the method comprising:
   interrogating via said data signal processing apparatus at least one database containing at least one set of personal data;
   deriving via said retrieval and classification system and said privacy filter at least one profile for at least one individual from the at least one set of personal data;
   said set of personal data includes at least one image;
   said deriving the at least one profile includes analyzing image content via a form of machine vision;
   making the at least one profile available for a fee to at least one third party; and
   compensating through a point system, reward, or fee via said transaction mediation engine the at least one individual represented by the at least one profile.

2. The method of claim 1 further comprising an image classifier wherein the said deriving of the at least one profile for the at least one individual from the at least one set of personal data includes analyzing image content with said image classifier via a form of machine vision.

3. The method of claim 2, wherein the at least one database comprises public records related to the at least one individual.

4. The method of claim 2, wherein the at least one database comprises photographs taken by the at least one individual, the at least one individual's family members, and the contents of the photographs related to the at least one individual.

5. The method of claim 2, wherein the at least one database comprises information from at least one social network.

6. The method of claim 2, wherein the interrogating comprises receiving a request for the at least one profile fitting at least one characteristic defined by the at least one third party.

7. The method of claim 2, wherein the at least one profile is a synthetic profile.

8. The method of claim 2, wherein the at least one database comprises information provided by the at least one individual or by third parties.

9. The method of claim 2, wherein the type of the at least one profile is specified by a third party.

10. The method of claim 2, wherein deriving the at least one profile comprises personal digital rights management.

11. The method of claim 2, further comprising:
collecting, analyzing, deriving, and updating the at least one individual's profile.

12. The method of claim 2, further comprising:
electronically transmitting digital data, unique data ownership identifiers, location information and account information from a computing device over a communications channel to a central receiving agency or a clearing house which stores such data and unique image identifiers, location information and account information in memory; identifying the at least one profile in the particular stored data set in the memory using a corresponding unique image identifier and locator information for purposes of sponsored printing of at least one image and at least one promotional material;
selecting interested parties appropriate for the at least one profile;
transmitting the at least one profile containing identified particular stored data in the memory to the sorting location of each of the interested party recipients; and
printing the image at a printing location of each of the recipients and delivering the printed image along with the promotional materials to the location corresponding to each of the recipients.

13. The method of claim 2 further comprising allowing the individual to opt out of making the profile available to specific third parties.

14. The method of claim 2 wherein the privacy filter is settable by the at least one individual.

15. A non-transitory computer readable medium storing a computer readable program code having stored thereon instructions for sponsored printing of images with promotional material comprising machine executable code which when executed by at least one processor, causes the processor to perform steps comprising:
interrogating at least one database containing at least one set of personal data;
retrieving said personal data through a privacy filter;
deriving at least one profile for at least one individual from the at least one set of personal data;
making the at least one profile available for a fee to at least one third party; and
compensating through a point system, reward, or fee the at least one individual represented by the at least one profile;
wherein the non-transitory computer readable medium storing a computer readable program code is a random access memory, a read only memory, a floppy disk, a hard disk or a compact disk read only memory.

16. The non-transitory computer readable medium storing a computer readable program code having stored thereon instructions for sponsored printing of images with promotional material comprising machine executable code which when executed by at least one processor of claim 15, wherein
said set of personal data includes at least one image;
and the step of said deriving the at least one profile includes analyzing image content via a form of machine vision.

17. A system for monetizing a profile of at least one individual comprising:
a user computing system comprising a transaction apparatus, said transaction apparatus comprising a transaction mediation engine, a retrieval and classification system, said retrieval and classification system comprising a form of machine vision, a commerce engine, and a data signal processing apparatus, said user computing system capable of interrogating via said data signal processing apparatus at least one database containing at least one set of personal data and deriving via said retrieval and classification system at least one profile for at least one individual from the at least one set of personal data; a privacy filter; and a transaction receiving agency capable of making the at least one profile available for a fee to at least one third party and compensating though a point system, reward, or fee via the transaction mediation engine the at least one individual represented by the at least one profile.

18. The system of claim 17 further comprising an image classifier.

19. The system of claim 17 wherein the privacy filter is settable by the at least one individual.

* * * * *